United States Patent [19]

Sheffler et al.

[11] Patent Number: 5,785,905
[45] Date of Patent: Jul. 28, 1998

[54] METHOD OF MAKING LIPSTICK SAMPLERS

[75] Inventors: Robert J. Sheffler, Morganville, N.J.; Charles Chang, 127 E. Edsall Ave., Palisades Park, N.J. 07650

[73] Assignee: Charles Chang, Wayne, N.J.

[21] Appl. No.: 526,446

[22] Filed: Sep. 11, 1995

[51] Int. Cl.$^6$ .............. B29B 17/00; B28B 1/38; B28B 7/18; A61K 7/027
[52] U.S. Cl. .............. 264/37; 264/344; 264/301; 264/303; 264/516; 425/269; 425/271; 425/275; 425/DIG. 32; 424/64
[58] Field of Search .............. 264/301, 303, 264/312, 37, 516, 446, 344; 425/803, 269, 271, 275, DIG. 32; 424/64

[56] References Cited

U.S. PATENT DOCUMENTS

| 495,406 | 4/1893 | Ferry | 425/269 |
|---|---|---|---|
| 2,128,827 | 8/1938 | Killian | 18/4 |
| 2,283,238 | 5/1942 | Thompson | 18/58 |
| 2,568,128 | 9/1951 | Morris | 18/58.7 |
| 3,978,568 | 9/1976 | Frydlender | 29/200 D |
| 4,435,352 | 3/1984 | Olsen et al. | 264/504 |
| 4,501,545 | 2/1985 | Divoky | 425/275 |
| 4,915,234 | 4/1990 | Boeller | 206/581 |
| 5,061,102 | 10/1991 | Rennie | 401/98 |
| 5,066,450 | 11/1991 | Steinicke | 264/500 |
| 5,069,232 | 12/1991 | Staar | 132/320 |
| 5,078,928 | 1/1992 | Balster et al. | 264/37 |
| 5,092,700 | 3/1992 | Susini et al. | 401/98 |
| 5,112,555 | 5/1992 | Morelli et al. | 264/271.1 |
| 5,200,173 | 4/1993 | Kamen et al. | 424/64 |
| 5,221,153 | 6/1993 | Spatz | 201/98 |
| 5,326,185 | 7/1994 | Dornbusch et al. | 201/88 |
| 5,620,639 | 4/1997 | Stevens et al. | 264/504 |

FOREIGN PATENT DOCUMENTS

| 1112008 | 5/1986 | Japan | 424/64 |
|---|---|---|---|
| 287946 | 4/1928 | United Kingdom | 18/58.4 |
| 2014852 | 9/1979 | United Kingdom | 424/64 |

*Primary Examiner*—Jan H. Silbaugh
*Assistant Examiner*—Robin S. Gray
*Attorney, Agent, or Firm*—H. Gibner Lehmann; K. Gibner Lehmann

[57] ABSTRACT

A method of manufacturing disposable, single-use lipstick samplers by means of a dipping process. In a preferred form, a reservoir containing molten lipstick wax material is provided, and a spindle which is disposed above the reservoir is advanceable toward and retractable away from the reservoir. A plastic cup-shaped form having an apertured tip is applied to the spindle, which is thereafter advanced so as to submerge the tip of the form into the molten liquid wax material. The spindle and coated form are then removed from the reservoir, and gas pressure applied through the spindle to the aperture of the tip of the form, so as to blow off excess lipstick wax material therefrom. The form is allowed to cool so as to solidify the wax, and thereafter is fitted with a cover, removed, and suitably packaged.

12 Claims, 2 Drawing Sheets

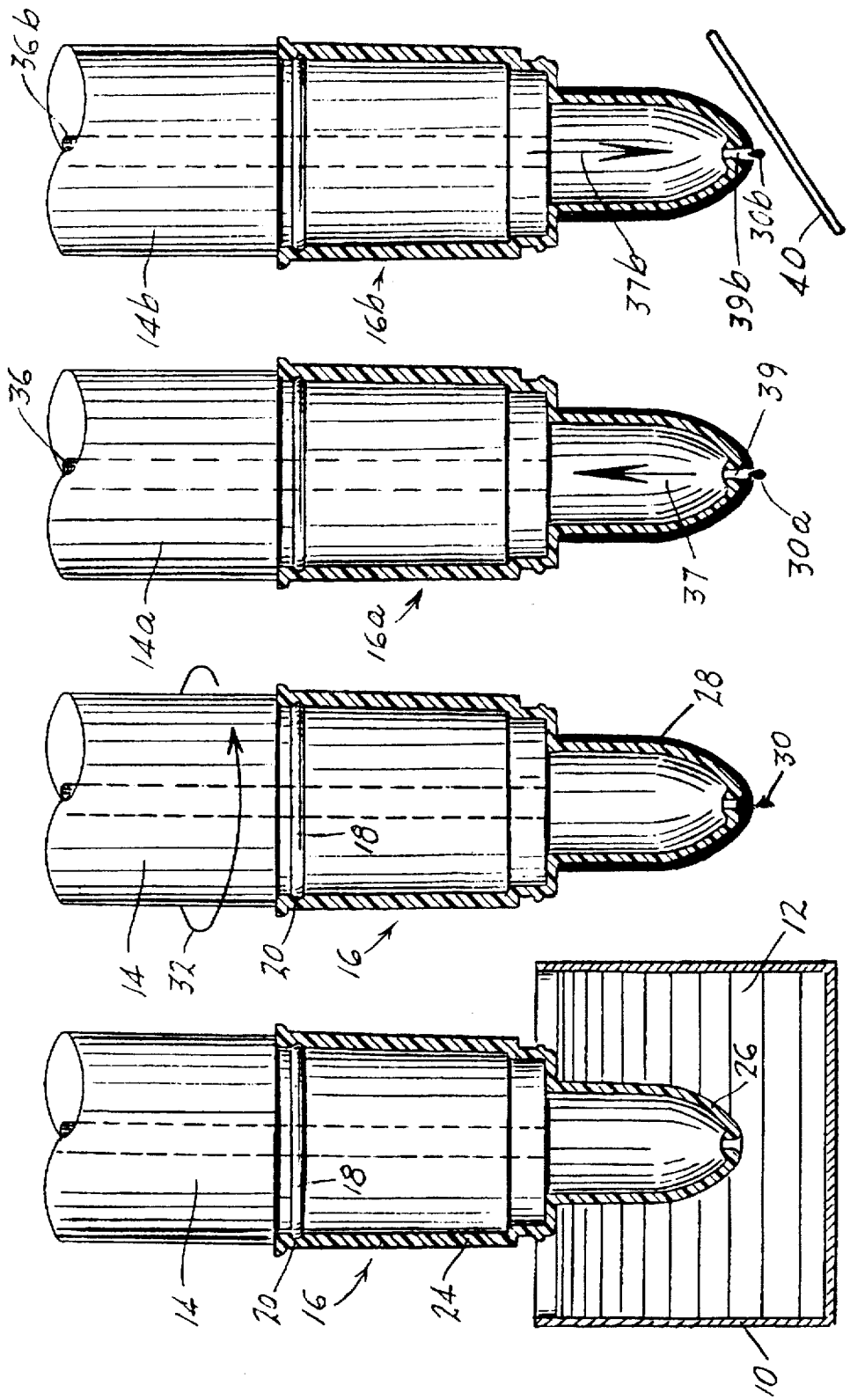

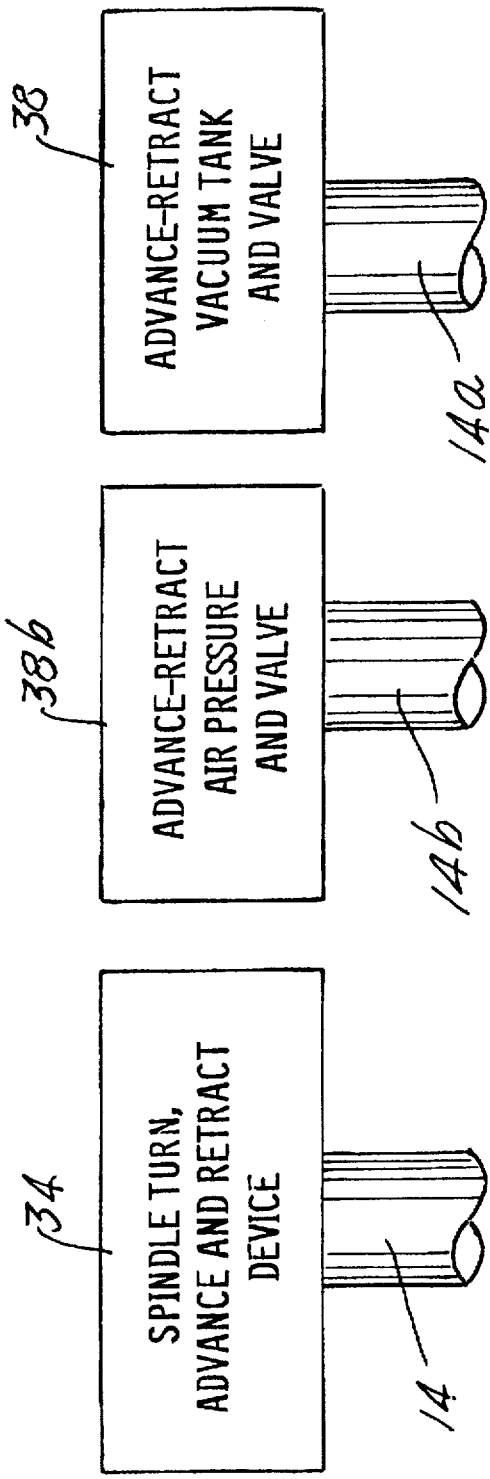

METHOD OF MAKING LIPSTICK SAMPLERS

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to cosmetic dispensers, and more particularly to a method of manufacturing single-use, disposable lipstick samplers, utilizing a dipping process.

DESCRIPTION OF THE RELATED ART INCLUDING INFORMATION DISCLOSED UNDER 37 CFR SECTIONS 1.97–1.99

The following patents are cited as being of interest in the field to which the present invention pertains.

U. S. Pat. Nos.:

| | | |
|---|---|---|
| 3,978,568 | 4,501,545 | 4,915,234 |
| 5,061,102 | 5,092,700 | 5,069,232 |
| 5,112,555 | 5,200,173 | 5,221,153 |
| 5,326,185 | | |

U.S. Pat. No. 5,112,555 discloses a method for producing articles constituted of solidified collagen layers, by utilizing a mandrel which is dipped into a bath of liquid collagen. The end product is stripped off the mandrel, and thereafter suitably packaged apart from the mandrel itself, which is used to form successive units.

U.S. Pat. Nos. 5,061,102 and 5,069,232 relate to procedures for manufacturing lipsticks, involving plastic lipstick forms and various types of dipping operations.

U.S. Pat. No. 4,501,545 discloses a manufacturing method involving dipping a plurality of rigid forms into a liquid bath, so as to produce elastic articles such as balloons.

U.S. Pat. No. 4,915,234 discloses a lipstick sampler which consists of multiple, stackable, telescoping casings having shallow recesses or concavities in their upper walls, to hold cosmetic material such as lipstick.

U.S. Pat. Nos. 3,978,568; 5,092,700; 5,200,173; 5,221,153; and 5,326,185 illustrate and describe cosmetic applicators which are produced by molding, as opposed to dipping.

In particular, U.S. Pat. No. 5,200,173 relates to a method to coat a mold piece with an ultrathin layer applied by a plasma treatment, which purportedly significantly facilitates smooth separation from the mold. According to the patent, the resulting product finish is aesthetically smooth and scratch-free so as to resemble one that has been "flamed" after molding.

While some of the disclosed products and methods may have had a degree of commercial success, in the case of molded lipsticks, the fabrication expense has become, in many cases, prohibitive, thus limiting the share of the market available to products utilizing this method.

In prior lipsticks formed by simple dipping operations, problems occurred with the uniformity of the coating, as well as the quality thereof. Extensive efforts have been made to produce lipsticks which have a high gloss, thereby enhancing their eye appeal and overall attractiveness to the consumer. These efforts are not without drawbacks, however, since often they require special after-treatments such as flaming, or other surface preparation, which increases the overall cost.

A particularly troublesome aspect of dipping operations is the formation of a droplet at the lowermost end of a dipped form. It appears that this problem has not been adequately addressed in many of the prior lipstick constructions produced by dipping, and thus it is considered that there exists a void in this area, which heretofore, has not been filled.

SUMMARY OF THE INVENTION

Accordingly, the above disadvantages and drawbacks of prior manufacturing methods are largely obviated by the present invention, which has for one object the provision of a novel and improved method of manufacturing lipstick samplers, which is extremely simple to practice and which results in a high-quality product that can be readily packaged with substantially no after-treatments, such as "flaming" and the like.

A related object of the invention is to provide an improved method as above characterized, wherein the fabrication cost is especially low, thereby to enable economical mass production of "single-use", disposable lipstick sampler units.

Still another object of the invention is to provide an improved method as above set forth, wherein there are eliminated problems with possible contamination as might otherwise occur with multi-use samplers, and the attendant risks associated with less-than-ideal conditions of sterility.

Yet another object of the invention is to provide an improved method of the kind indicated, which lends itself to mass production techniques, thereby resulting in overall manufacturing economy and minimal material waste.

Still another object of the invention is to provide an improved method in accordance with the foregoing, wherein there is greatly facilitated use of the product by the consumer, with no need for special instructions or the like.

The above objects are accomplished by a novel method of making lipstick samplers, in an apparatus comprising a reservoir containing a bath of molten lipstick wax material, and comprising a spindle which is disposed above the reservoir and which is advanceable toward and retractable away from the reservoir, and also capable of turning with respect thereto. The method involves coating a plastic cup-shaped form with the lipstick wax material, and comprises the steps of placing the plastic form on the spindle, advancing the spindle and form so as to dip the form into the molten lipstick wax material contained in the reservoir, and retracting the spindle and coated form from the reservoir. The method further comprises rotating the spindle and coated form at a speed sufficient to disperse a portion of the lipstick wax material from the form and thereby minimize excess accumulation of the wax material thereon, and cooling the remaining, retained wax material so as to solidify the same on the form.

The wax product clings to the form, and remains in place during the entire useful life of the lipstick sampler, until it is discarded.

The objects are also accomplished, in another embodiment of the invention, by a method of coating an apertured form with lipstick wax material from a reservoir, the method comprising the steps of applying the plastic form onto the spindle, advancing the spindle so as to dip the plastic form into the reservoir and submerge the tip of the form in the molten lipstick wax material contained therein, and retracting the spindle and form from the reservoir. Upon withdrawal of the form, it retains a coating of the lipstick wax material. The method further comprises the step of creating a vacuum so as to draw air inwardly through the aperture of the form while the lipstick wax material is still fluid, thereby to minimize excess accumulation of the wax material on the form, and thereafter cooling the wax material so as to solidify it on the form, such that it is permanently retained as a coating thereon.

The objects are further accomplished, in a preferred embodiment of the invention, by a method of coating, with a lipstick wax material, a plastic cup-shaped form having an aperture, the method comprising the steps of applying the plastic form onto the spindle, advancing the spindle so as to dip the plastic form into the reservoir and submerging the tip of the form in the molten lipstick wax material contained therein, and thereafter retracting the spindle and coated form from the reservoir. The method further comprises generating a gas flow outwardly through the aperture of the form while the lipstick wax material is still fluid, thereby to dislodge excess accumulation of the wax material on the form, and thereafter cooling the wax material so as to solidify the same on the form.

The arrangement is such that there is effectively eliminated any tendency for the formation of a droplet at the lowermost tip of the plastic form, as a consequence of gravity acting upon the coating during and after withdrawal from the reservoir. This is accomplished by either dispersing the droplet through rotation of the form, or by application of either vacuum or gas pressure to the aperture of the form. Optionally, any excess removed by the vacuum or gas pressure can be collected, and returned to the reservoir in a molten state so as not to waste material.

Other features and advantages will hereinafter appear.

BRIEF DESCRIPTION OF THE DRAWINGS

In the drawings, illustrating several embodiments of the invention:

FIG. 1 is an axial section of the spindle-mounted plastic form immersed in molten lipstick wax material contained in a reservoir, showing one step of the method of the invention.

FIG. 2 is an axial section of the form and showing the spindle in elevation, wherein the latter is rotated at a speed which is sufficient to disperse a droplet that tends to accumulate at the lowermost tip of the form.

FIG. 3 is a view like FIG. 2, but showing another embodiment of the invention, wherein following the immersion of the plastic form in the reservoir, a vacuum is applied through an aperture in the lowermost tip of the form, to remove excess wax accumulating thereon.

FIG. 4 is a view like FIGS. 2 and 3, except showing still another embodiment of the invention, wherein following immersion of the plastic form in the reservoir, compressed gas applied through the interior of the form is forced outwardly through the the aperture in the lowermost tip portion thereof, to thus remove excess wax.

FIG. 5 is a diagrammatic representation of the spindle and its drive mechanism, as utilized in carrying out the method of FIGS. 1 and 2.

FIG. 6 is a view like FIG. 5, of the spindle and its drive mechanism, as utilized in carrying out the method of FIGS. 1 and 4, and FIG. 7 is a view like FIGS. 5 and 6, of the spindle and its drive mechanism, as utilized in carrying out the method of FIGS. 1 and 3.

DESCRIPTION OF THE PREFERRED EMBODIMENTS

The present invention involves a novel method for manufacturing lipstick samplers, and in its essential form, utilizes a tank or reservoir of molten lipstick wax material, a spindle which can be turnably driven as well as advanced toward and retracted from the reservoir from above, and a plastic cup-shaped form which is attachable to and removable from the spindle and which is carried thereby during various processing steps to be described in more detail below.

Referring now the drawings, FIG. 1 shows a tank or reservoir generally designated by the numeral 10, containing a quantity or bath of lipstick wax material 12 in molten form, and a spindle 14 which carries the cup-shaped plastic form 16 and which is removably secured thereto as by a snap fit between an external bead 18 on the spindle 14 and the walls of a corresponding internal annular groove 20 in the form 16. The cup-shaped form 16 can be molded polypropylene or other rigid plastics, and has a substantially cylindrical body 24 and a bulbous tip portion 26 corresponding generally to the shape of a typical lipstick.

The molten lipstick wax material or bath 12 is maintained, for example, at a temperature between 130 and 200 degrees F., by suitable temperature control means (not shown), and the reservoir 10 can take the form of an elongate trough having a transverse cross-sectional configuration substantially as shown in FIG. 1.

Referring again to FIGS. 1 and 5, in practicing the method of the invention, the plastic form 16 is first fitted to the spindle 14. Thereafter the spindle 14 is advanced downwardly so as to immerse the tip portion 26 of the form 16 into the molten lipstick wax material 12 contained in the reservoir 10, so that minimal heating of the plastic form 16 per se occurs. The spindle 14 and coated form 16 are then withdrawn, and immediately thereafter the spindle 16 is turnably driven or spun while the coating thereon, now designated 28 in FIG. 2, is still in a mostly fluid state. Due to gravity, a droplet 30 of wax material tends to accumulate at the end of the tip portion 26 immediately upon the latter leaving the bath 12, and it has been discovered that the droplet 30 can be re-distributed radially outwardly or slung radially outwardly and upwardly on the form's tip portion by such turning or spinning, the rate being up to 1500 revolutions per minute. The spindle rotation is indicated by the arrow 32 in FIG. 2; the spindle 14 is controlled by a mechanism 34, FIG. 5, which includes a spindle advance/retract device, and turnable drive means. The distribution of wax occurs as a consequence of centrifugal force on the droplet 30 as the spindle is turnably driven. The spinning also causes a rapid cooling of the coating 28 of the wax material, all to the end that a relatively uniform and smooth finish is imparted to the outer surface of the coating 28 on the tip portion 26. Coatings 28 up to 0.060 inches in thickness or more, can be obtained. The time interval during which the form is in contact with the bath can be up to 10 seconds or more. Cooling of the coating typically takes only 3–10 seconds, due to the low masses involved.

The resultant coated form 16 can thereafter be fitted with a snap-type cover (not shown), removed from the spindle 14, and suitably packaged for display or sale.

It has been found that the surface finish imparted to the coating 28 is surprisingly smooth and free from surface imperfections, thereby obviating the need for after-treatments such as "flaming" and the like; such techniques have been utilized in the past in order to provide a smooth surface and/or shiny characteristic to lipsticks, to enhance their overall appearance and eye-appeal.

In a preferred embodiment, the spindle 14 is not spun until the form 16 is completely removed from the bath 12. However, depending on the viscosity and other characteristics of the wax material being applied, it may be desirable under some circumstances, to commence turning of the spindle 14 while the plastic form 16 is still immersed, either partially or wholly, such variations being considered to fall within the scope of the invention.

Another embodiment of the invention is illustrated in FIGS. 3 and 7, wherein there is illustrated a spindle 14a carrying a plastic form 16a, and wherein the spindle 14a comprises an internal evacuation or vacuum channel 36 which is controlled by a hydraulic system 38, FIG. 7, comprising a vacuum source and a valve at the opposite end of the spindle 14a. As in the previous embodiment, the plastic form 16a is fitted to the spindle 14a. The form 16a has an aperture 39 at its tip portion, which communicates with the interior of the form and with the vacuum line 36. The size of the aperture can be between 0.005 and 0.060 inches, as presently understood, but other sizes may possibly produce similar results, depending on the bath temperature, or other conditions, such as those relating to the nature of the particular characteristics of the wax that is utilized.

In carrying out the method of the invention, the spindle 14a and form 16a are advanced downwardly toward the reservoir 10 in FIG. 1, so as to immerse the tip portion of the form 16a in the molten lipstick wax material 12, typically for a time interval of contact with the molten wax material of up to 10 seconds or more. In the present arrangement, the spindle 14a does not rotate.

Upon withdrawal of the spindle 14a and coated form 16a, there is immediately applied a suction to the evacuation line 36, indicated by the arrow 37 in FIG. 3, which in turn draws air into the aperture 39 and, along with it, any excess wax material which has accumulated in the form of a droplet 30a. Such a droplet 30a is indicated in FIG. 3. Depending on the dimensions of the aperture 39 and the characteristics of the wax material, the droplet can be effectively dispersed, using a vacuum on the order of up to 20 inches of Hg. or more, and over a relatively short time interval. Optionally, the wax material drawn up the vacuum line 36 can be heated so as to remain in a fluid state, and thereafter returned to the reservoir 10 through suitable tubing (not shown). Control of the vacuum is effected by the valve of the hydraulic system 38 in FIG. 7.

After the coating has cooled sufficiently, the form 16a is fitted with a cover, removed from the spindle 14a, and packaged, as in the prior embodiment.

Yet another embodiment of the invention is shown in FIGS. 4 and 6. The spindle 14b carries a plastic form 16b having an aperture 39b at its tip portion. The size of the aperture can be between 0.005 and 0.060 inches, as presently understood, but other sizes could possibly produce similar results, as noted above. The spindle 14b is hollow, and communicates with the interior of the form 16b. The hollow constitutes a pressurized air (gas) channel 36b which is controlled by a hydraulic system 38b, FIG. 6, comprising a valve at the opposite end of the spindle 14b. In carrying out the present method, the spindle 14b and form 16b are advanced downwardly in FIG. 1 toward the reservoir 10, immersing the tip portion of the form 16b in the molten lipstick wax material 12. The tip portion remains in contact with the wax material for a time interval of up to 10 seconds or more, forming a coating similar to coating 28 of FIG. 2. Longer immersion intervals are possible, to produce a thinner coating, for all embodiments.

As the spindle 14b and coated form 16b are withdrawn, the gas channel 36b is momentarily pressurized by the valve 38b, FIG. 6, pressurizing the interior of the form 16b and creating gas flow in the direction of arrow 37b in FIG. 4. This dislodges or blows off a small quantity of the droplet 30b that tends to accumulate at the end of the tip portion. The excess wax material can preferably be collected on a heated collection plate 40 and returned to the reservoir 10, so as not to waste material.

As in the prior embodiment, the droplet 30b can be effectively dispersed or blown away over a relatively short time interval.

After the coating has cooled sufficiently, the form 16b is fitted with a cover, removed from the spindle 14b, and packaged, as in the prior embodiments.

In all three embodiments, the need for after-treatment is effectively eliminated, since the resultant surface coatings on the forms 16, 16a, 16b have been found to be aesthetically free from surface irregularities. The use of either compressed gas or vacuum at the apertures of the tip portions of the forms has been found to constitute an effective method for dispersing the droplets which tend to accumulate, and thus provides in each case, a relatively uniform surface coating.

Generally, the brief period during which the forms 16, 16a, 16b are immersed results in a relatively thicker coating than would occur if the forms were immersed for a longer period of time. In the latter instance, the form itself can be heated to a temperature approaching that of the bath, and under such circumstances, when the form is withdrawn there is a tendency for less wax to adhere to it. The resulting coating thickness is thus less than that corresponding to a smaller immersion time interval, as can be readily understood.

From the above it can be seen that we have provided novel and improved methods for manufacturing lipstick samplers, the steps being relatively straightforward, and the method lending itself to mass production.

The need for after-treatment of the resultant surface coating is largely eliminated. Prior techniques, such as "flaming" or plasma treatments, can therefore be dispensed with, thereby avoiding the need for further steps in the manufacturing procedure.

The disclosed methods are thus seen to represent a distinct advance and improvement in the cosmetic field.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A method of making a lipstick sampler with an apparatus which consists of a reservoir containing molten fluid lipstick wax material, a spindle which is disposed above the reservoir and which is advanceable toward and retractable away from the reservoir, and a plastic cup-shaped form having a tip, and having an aperture in the tip, comprising the steps of:

a) applying the plastic cup-shaped form onto the spindle, b) advancing the spindle to dip the plastic cup-shaped form into the reservoir and submerging the tip of the plastic cup-shaped form in the molten fluid lipstick wax material contained therein for a time interval to form a coating of said molten fluid lipstick wax material on the plastic cup-shaped form and form a coated plastic cup-shaped form, c) retracting the spindle and the coated plastic cup-shaped form from the reservoir, an excess accumulation of said molten fluid lipstick wax material forming on the tip at the aperture, d) applying a pressurized gas to the coated plastic cup-shaped form to cause said pressurized gas to flow outwardly through the aperture of the coated plastic cup-shaped form while said molten fluid lipstick wax material is fluid, thereby dislodging the excess accumulation of the molten fluid lipstick wax material from the coated plastic cup-shaped form, and e) cooling the molten fluid lipstick wax material on the coated plastic cup-shaped form to solidify the molten fluid lipstick wax material on the coated plastic cup-shaped form.

2. The method as set forth in claim 1, wherein the step of dipping the plastic cup-shaped form into the molten fluid lipstick wax material is effected when the temperature of the molten fluid lipstick wax material is between 130 degrees F. and 200 degrees F.

3. The method as set forth in claim 1, and including the step of holding the spindle in an advanced position until the coating of said molten fluid lipstick wax material on the plastic cup-shaped form has a thickness of up to 0.060 inches.

4. The method as set forth in claim 1, wherein the step of submerging for a time interval includes the step of holding the spindle in an advanced position in the molten fluid lipstick wax material for up to 10 seconds.

5. The method as set forth in claim 1, further comprising cooling the coated plastic cup-shaped form for a time interval of less than 10 seconds after said step of retracting the coated plastic cup-shaped form from the molten fluid lipstick wax material.

6. The method as set forth in claim 1, wherein after the spindle and the plastic cup-shaped form are advanced, both of said spindle and said plastic cup-shaped form are held in an advanced position for a time interval that is greater than 0.5 seconds.

7. The method as set forth in claim 1, wherein the step of applying a pressurized gas comprises blowing a droplet of said molten fluid lipstick wax material off the coated plastic cup-shaped form with said pressurized gas.

8. The method as set forth in claim 7 further comprising, following said step of blowing, collecting the droplet on a heated collection plate, and returning the droplet to the reservoir.

9. The method as set forth in claim 7, wherein the step of applying a pressurized gas comprises the step of forcefully blowing the pressurized gas through the aperture in the tip.

10. The method as set forth in claim 1, wherein the coating of molten fluid lipstick wax material builds up a thickness of the molten fluid lipstick wax material on the plastic cup-shaped form, and further including the step of gauging the thickness of the coating on the plastic cup-shaped form by the temperature of the molten fluid lipstick wax material in the reservoir.

11. The method as set forth in claim 1, wherein the plastic cup-shaped form builds up a thickness of the molten fluid lipstick wax material during said submerging step, said submerging step further including the step of gauging the thickness of the coating on the plastic cup-shaped form by the length of the time interval during which the plastic cup-shaped form is in the molten fluid lipstick wax material.

12. A method of making a lipstick sampler with an apparatus which consists of a reservoir containing molten fluid lipstick wax material, a spindle which is disposed above the reservoir and which is advanceable toward and retractable away from the reservoir, and a plastic cup-shaped form having a tip and having an aperture in the tip, comprising the steps of:

a) applying the plastic cup-shaped form onto the spindle, b) advancing the spindle to dip the plastic cup-shaped form into the reservoir and submerging the tip of the plastic cup-shaped form in the molten fluid lipstick wax material contained therein to form a coating of molten fluid lipstick wax material on the plastic cup-shaped form and provide a coated plastic cup-shaped form, c) retracting the spindle and the coated plastic cup-shaped form from the reservoir, an excess accumulation of said molten fluid lipstick wax material forming on the tip at the aperture, d) effecting a flow of pressurized gas through the aperture of the coated cup-shaped form while said molten fluid lipstick wax material is fluid, thereby dislodging the excess accumulation of the molten fluid lipstick wax material from the coated plastic cup-shaped form, and e) cooling the molten fluid lipstick wax material on the coated cup-shaped form to solidify the molten fluid lipstick wax material on the coated plastic cup-shaped form.

* * * * *